(12) United States Patent
Schultz et al.

(10) Patent No.: US 8,739,271 B2
(45) Date of Patent: May 27, 2014

(54) NETWORK INFORMATION COLLECTION AND ACCESS CONTROL SYSTEM

(75) Inventors: Paul T. Schultz, Colorado Springs, CO (US); Mark J. Hahn, Stow, MA (US); Robert A. Sartini, Colorado Springs, CO (US); William D Goodman, Collegeville, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 45 days.

(21) Appl. No.: 13/327,311

(22) Filed: Dec. 15, 2011

(65) Prior Publication Data

US 2013/0160138 A1   Jun. 20, 2013

(51) Int. Cl.
*G06F 17/00* (2006.01)
*G08B 23/00* (2006.01)
*G06F 7/04* (2006.01)
*H04L 29/06* (2006.01)
*H04L 9/32* (2006.01)
*G06F 15/173* (2006.01)

(52) U.S. Cl.
USPC ............ 726/13; 726/22; 726/27; 713/154; 713/168; 709/224

(58) Field of Classification Search
USPC ............ 726/26, 27, 13, 22; 705/50, 64, 74; 709/223, 224, 225; 713/154, 168
See application file for complete search history.

(56) References Cited

U.S. PATENT DOCUMENTS

| | | | | |
|---|---|---|---|---|
| 6,754,470 | B2 * | 6/2004 | Hendrickson et al. | 455/67.11 |
| 7,930,252 | B2 * | 4/2011 | Bender et al. | 705/74 |
| 7,958,523 | B2 * | 6/2011 | Chen | 725/9 |
| 7,996,912 | B2 * | 8/2011 | Spalink et al. | 726/26 |
| 8,095,377 | B2 * | 1/2012 | Resato et al. | 705/1.1 |
| 8,249,016 | B1 * | 8/2012 | Kalbag et al. | 370/331 |
| 8,321,952 | B2 * | 11/2012 | Spalink et al. | 726/26 |
| 2004/0019787 | A1 * | 1/2004 | Shibata | 713/168 |
| 2008/0141337 | A1 * | 6/2008 | Yeung et al. | 726/1 |
| 2010/0034376 | A1 * | 2/2010 | Okuizumi et al. | 380/44 |
| 2010/0325691 | A1 * | 12/2010 | Willars et al. | 726/1 |

* cited by examiner

*Primary Examiner* — Aravind Moorthy

(57) ABSTRACT

An approach is provided for collecting and controlling access to network information. A network information anonymizer receives network information associated with a device, separates the network information into anonymized network information and user identifiable information, and enables access to the anonymized network information independently of the user identifiable information based on a privacy setting.

18 Claims, 16 Drawing Sheets

NETWORK INFORMATION COLLECTION AND ACCESS CONTROL SYSTEM

BACKGROUND INFORMATION

Service providers are continually challenged to deliver value and convenience to consumers by providing compelling network services and advancing the underlying technologies. For example, in recent years, wireless networking technologies have offered users the convenience of mobility and ease of connection to a network. In addition, mobile devices have greatly increased with respect to functionality as well as the quantity and quality of information collected. Network information (e.g., location information, radio performance information, network traffic usage, latency, etc.), for instance, can be collected to optimize network performance and/or improve user experience. However, increased data collection raises privacy concerns, especially from consumers who do not wish to share such data. Accordingly, service providers face significant technical challenges to facilitating collection and access to network information while maintaining user privacy.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and system for network information collection and access control are described. In the following description, for the purposes of explanation, numerous specific details are set forth in order to provide a thorough understanding of the embodiments of the invention. It is apparent, however, that the embodiments may be practiced without these specific details or with an equivalent arrangement. In other instances, well-known structures and devices are shown in block diagram form in order to avoid unnecessarily obscuring the embodiments of the invention.

Figure 1:
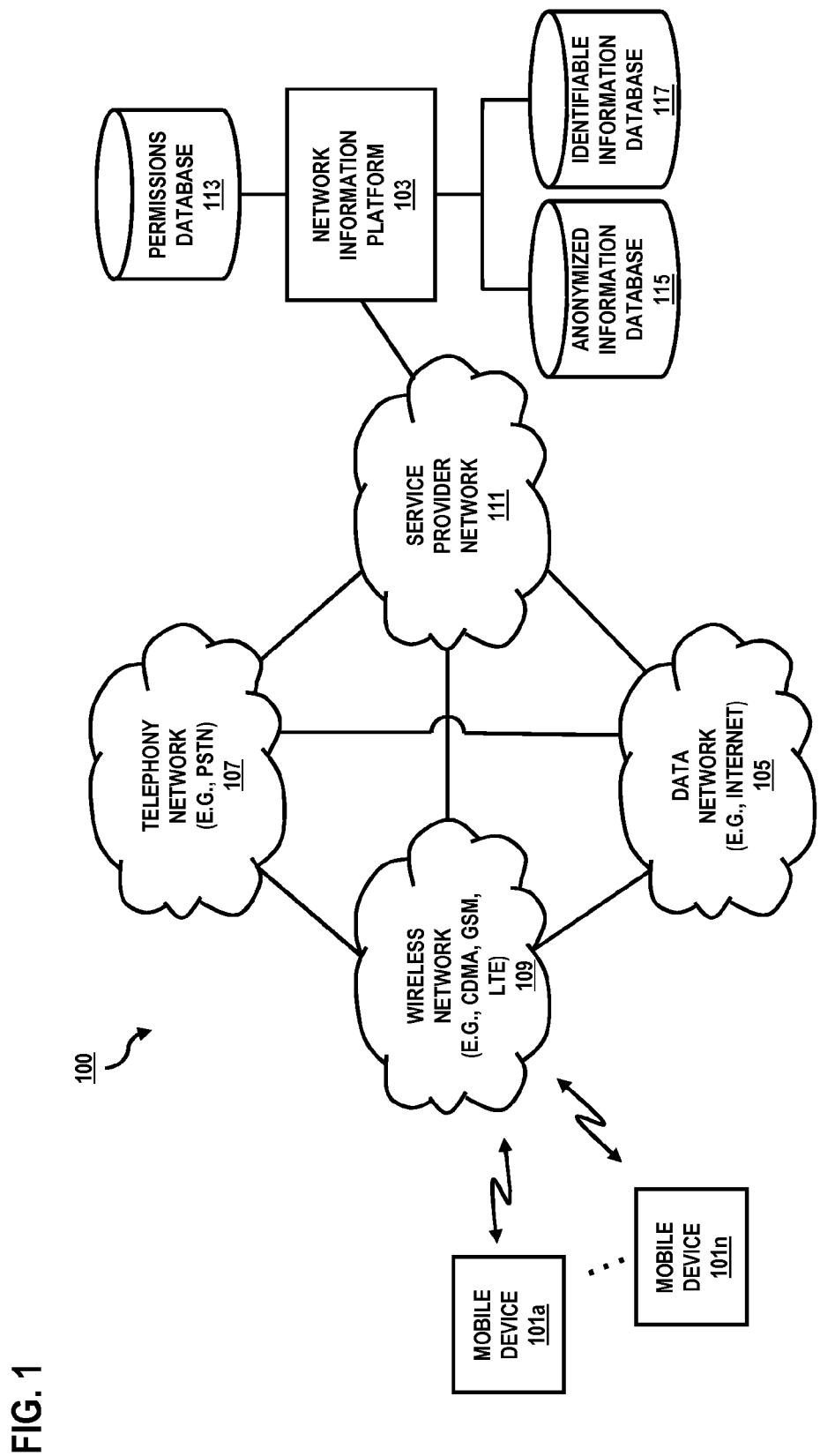
FIG. 1 is a diagram of a system capable of providing network information collection and access control, according to an exemplary embodiment.

FIG. 1 is a diagram of a system capable of providing network information collection and access control, according to an exemplary embodiment. For the purposes of illustration, the system 100 employs mobile devices 101a-101n (or mobile device(s) 101) that may interact with network information platform 103 over one or more networks (e.g., data network 105, telephony network 107, wireless network 109, etc.). According to one embodiment, services including network information collection and controlled access may be part of managed services supplied by a service provider (e.g., a wireless communication company) as a hosted or subscription-based service made available to users of the mobile devices 101 through a service provider network 111. As shown, the network information platform 103 may be a part of or connected to the service provider network 111. According to another embodiment, the network information platform 103 may be include within or connected to the mobile devices 101 or any other component of the system 100. While specific reference will be made thereto, it is contemplated that the system 100 may embody many forms and include multiple and/or alternative components and facilities.

In certain embodiments, the network information platform 103 may include or have access to a permissions database 113, an anonymized information database 115, and an identifiable information database 117. For example, the network information platform 103 may access the permissions database 113 to obtain service provider settings, user privacy settings, etc., to determine whether various network information associated with particular users may be shared with third parties and applications. Moreover, the network information platform 103 may, for instance, access the anonymized information database 115 and the identifiable information database 117 to respectively obtain anonymized network information and user identifiable information of associated users.

As discussed, users may benefit from the collecting of network information, for instance, by service providers since such information may be utilized to optimize network performance and/or to improve user experience. However, traditional means of collecting data have raised potential privacy concerns from consumers. For example, location detection technologies can continuously detect a user's location and transmit the user's identity and location information to third parties. In addition, a user's mobile directory number and contact list containing the mobile directory numbers of a user's contacts may be transmitted to third parties. Moreover, many attempts to limit access often rely merely on the recipient of user information to honor the privacy settings. The inflexibility in privacy settings and lack of a means to ensure privacy often times results in little, or no, collection of network information.

To address this issue, the system 100 of FIG. 1 introduces the capability to collect and control access to network information. By way of example, the network information platform 103 may receive network information associated with a device. Upon receipt, the network information platform 103 may separate the network information into anonymized network information and user identifiable information. The anonymized network information may, for instance, include location history, network usage history, user context information, etc. The user identifiable information may include a username, a Mobile Directory Number (MDN), a Media Access Control (MAC) address, and/or a Mobile Subscriber Integrated Services Digital Network Number (MSISDN), a Subscriber Identity Module (SIM) serial number, International Mobile Subscriber Identity (IMSI), etc. To vary and control access to these information sets, the network information platform 103 may, for instance, enable access to the anonymized network information independently of the user identifiable information based on a privacy setting. In this way, the anonymized network information may be used to support any number of applications without exposing potentially sensitive user identifiable information (e.g., mobile device numbers, network addresses, location information, etc.) that are typically collected with unanonymized network information. By way of example, these applications may (1) provide maps or views (e.g., augmented reality views, virtual reality views, etc.) that represent network information in the user's environment, (2) share network information for social interaction and collective intelligence, (3) optimize network performance, and/or (4) obfuscate and present network resource information based on access rights.

It is noted that the mobile devices 101 may be any type of mobile terminal including a mobile handset, mobile station, mobile unit, multimedia computer, multimedia tablet, communicator, netbook, Personal Digital Assistants (PDAs), smartphone, sensor, media receiver, etc. It is also contemplated that the mobile devices 101 may support any type of interface for supporting the presentment or exchange of data. In addition, mobile devices 101 may facilitate various input means for receiving and generating information, including touch screen capability, keyboard and keypad data entry, voice-based input mechanisms, accelerometer (e.g., shaking the mobile device 101), haptics, and the like. Any known and future implementations of mobile devices 101 are applicable. It is noted that, in certain embodiments, the mobile devices 101 may be configured to establish peer-to-peer communication sessions with each other using a variety of technologies—i.e., near field communication (NFC), Bluetooth, infrared, etc. Also, connectivity may be provided via a wireless local area network (LAN). By way of example, a group of mobile devices 101 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 101, i.e., IP addresses that are accessible to devices connected to the service provider network 111 as facilitated via a router.

In some embodiments, the network information platform 103 may generate a correlation key associated with the anonymized network information and the user identifiable information. In one scenario, the correlation key may be generated to help facilitate the separate or independent treatment of anonymized network information (e.g., location, radio network environment, etc.) and user identifiable information (e.g., mobile directory number, media access control number, etc.). As an example, a request for the anonymized network information may be permitted without the correlation key, while a request for the user identifiable information may be denied if the request does not include the correlation key. As such, access to the two information sets may be based, for instance, on the user's privacy and permissions settings, service provider settings, etc. In this way, the anonymized network information can be accessed independently of the user identifiable information.

In certain embodiments, the network information platform 103 may receive the correlation key from a requester. The network information platform 103 may then enable access by the requester to the user identifiable information associated with the correlation key. In one scenario, the correlation key may only be provided to those services, applications, requesters, etc., that have access rights to the user identifiable information. For example, the correlation key may be used to enable emergency event network optimization. Emergency event network optimization may include, for instance, quality of service (QoS) treatment for emergency responders, and source identification of emergency communications (e.g., mobile directory number of an emergency call).

In various embodiments, the network information platform 103 may encrypt user identifiable information. Additionally, or alternatively, network information platform 103 may transmit the network information such that the user identifiable information and the anonymized network information are separately received. That is, the network information platform 103 may send the anonymized network information at a different time, or a different channel, than the associated user identifiable information. In one embodiment, the network information platform 103 limits access to the user identifiable information associated with the correlation key by use of authentication. For instance, a username and password, procedure may be employed to obtain information associated with the correlation key.

In other embodiments, the network information platform 103 may anonymized all of the network information. As such, access to the network information, the anonymized network information, and/or the user identifiable information may be enabled to improve a user experience associated with the device. Moreover, access by one or more third parties to the network information, the anonymized network information, and/or the user identifiable information may be enabled. In one scenario, anonymously shared user history (e.g., location, network usage, etc.) and user context information (e.g., calendar, network preferences, etc.) may be utilized to facilitate the improvement of network coverage (e.g., increase capacity at a location). In another scenario, the information may, for instance, be utilized to facilitate monitoring and reporting of issues, to reduce network congestion (e.g., capacity planning and network resource optimization using data relating to capacity, signal strength, etc.), to leverage network operation information (e.g., cell site availability, cell site signal strength, radio antenna configuration, backhaul network availability capacity, cell site location, network maintenance, etc.) to plan maintenance or cell site locations, etc.

In particular embodiments, the network information platform 103 may process the anonymized network information to determine a radio antenna configuration, and/or a handoff configuration for facilitating communications associated with the devices. In one scenario, user-provided anonymized network information may be utilized to facilitate improvements, such as optimizing radio antenna configurations, predicting locomotion for anticipating handoffs, etc. These improvements may enable the user to receive greater signal strength, seamless roaming, and improved handoffs.

In certain embodiments, the network information platform 103 may receive a query for the network information. Based on the query, the network information platform 103 may generate a response to the query using the anonymized network information. In further embodiments, the network information platform 103 may render a user interface for presenting the response to the query. The user interface may, for instance, be an augmented reality display, a virtual reality display, a mapping display, and/or a signal strength display. By way of example, a user may utilize the mobile device 101 to query for certain network information, such as network coverage areas, the signal strength of particular areas, the type of network in various areas, etc. In response, the network information platform 103 may initiate a presentation, on an augmented reality display of the mobile device 101, of the network coverage areas along with the signal strength and the types of networks associated with particular portions of the network coverage areas.

In some embodiments, the network information platform 103 may use the anonymized network information to obfuscate contextual information associated with a network resource. The contextual information may, for instance, include at least a location (e.g., physical location) of the network source. In one scenario, the location information associated with the network resource may be obfuscated for some users, while privileged users (e.g., network operators and support personnel) may be provided with accurate network resource locations. Obfuscated location information may, for instance, still be beneficial to users since it may still provide indications for better service (e.g., indications to move closer to a particular area for better reception). Nonetheless, the obfuscation enables certain contextual information associated with a network resource to be protected.

As illustrated in FIG. 1, service provider network 111 enables mobile devices 101 to access the features and functionality of network information platform 103 via one or more of networks 105-111. Networks 105-111 may be any suitable wireline and/or wireless network. For example, telephony network 107 may include a circuit-switched network, such as the public switched telephone network (PSTN), an integrated services digital network (ISDN), a private branch exchange (PBX), or other like network. Wireless network 109 may employ various technologies including, for example, code division multiple access (CDMA), Long Term Evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 105-111 may be completely or partially contained within one another, or may embody one or more of the aforementioned infrastructures. For instance, service provider network 111 may embody circuit-switched and/or packet-switched networks that include facilities to provide for transport of circuit-switched and/or packet-based communications. It is further contemplated that networks 105-111 may include components and facilities to provide for signaling and/or bearer communications between the various components or facilities of system 100. In this manner, networks 105-111 may embody or include portions of a signaling system 7 (SS7) network, or other suitable infrastructure to support control and signaling functions. As such, the conjunction of networks 105-111 may be adapted to facilitate network information collection and access control.

Figure 2:
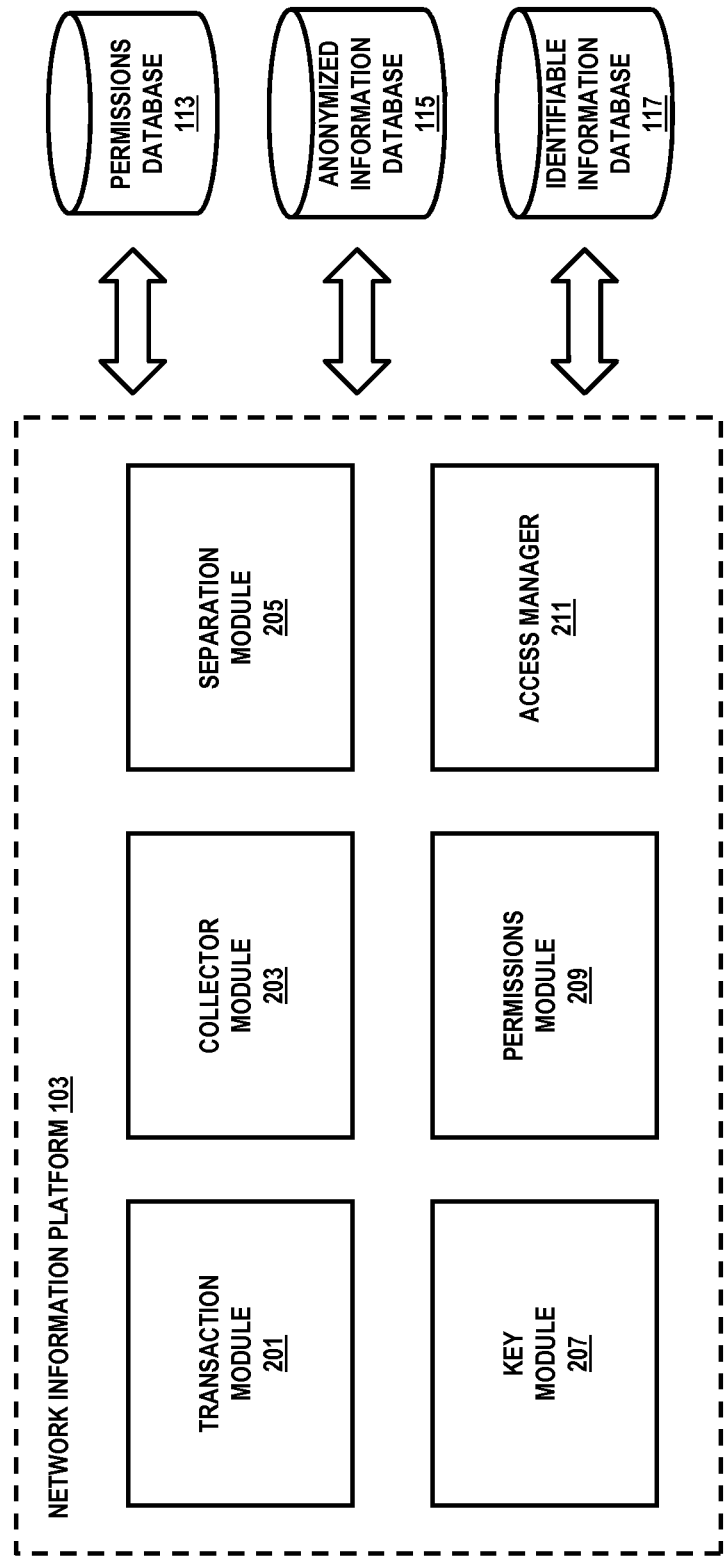
FIG. 2 is a diagram of the components of a network information platform, according to an exemplary embodiment.

FIG. 2 is a diagram of the components of a network information platform, according to an exemplary embodiment. Network information platform 103 may comprise computing hardware (such as described with respect to FIG. 10), as well as include one or more components configured to execute the processes described herein for providing the network information collection and access control of system 100. In one implementation, network information platform 103 includes a transaction module 201, a collector module 203, a separation module 205, a key module 207, a permissions module 209, and an access manager 211. While specific reference will be made to this particular implementation, it is also contemplated that network information platform 103 may embody many forms and include multiple and/or alternative components. For example, it is contemplated that the components of network information platform 103 may be combined, located in separate structures, or separate locations. Specifically, in various embodiments, components of the network information platform 103 may be located in mobile devices 101.

The transaction module 201 may be utilized to send and receive information to and from the mobile devices 101, network elements including home location register (HLR), authentication, authorizing and accounting (AAA) system, home subscriber server (HSS), packet gateway, deep packet inspection systems, and the like. For example, in one embodiment, the transaction module 201 may receive user identifiable information, anonymized network information, and privacy and permissions settings from mobile device 101, the service provider network 111, network elements, or another device connected to the one or more networks 105-111. Additionally, the transaction module 201 may send anonymized network information as directed by the permissions module 209. In another embodiment, the transaction module 201 receives authentication information and a correlation key, and sends the user identifiable information associated with the correlation key. The communication method may be, for instance, over the one or more networks 105-111 and may use a variety of communication methods in a single transaction, including code division multiple access (CDMA), wireless fidelity (WiFi), short message service (SMS), multimedia messaging service (MMS), etc. In addition or alternatively, a mobile web portal may be used for setting privacy and permissions, collecting data, and obtaining user identifiable information, for instance, for emergency event network optimization.

According to exemplary embodiments, the collector module 203 may process anonymized information stored in the anonymized information database 115 to enhance the functionality of the mobile device 101. Moreover, the separation module 205 may be utilized to separate network information into user identifiable information and anonymized network information. For example, a mobile device 101, and network elements including HLR, AAA system, HSS, packet gateway, deep packet inspection systems and the like, may transmit to the network information platform 103 a combination of user identifiable information (e.g., mobile directory number) and network information (e.g., signal strength). In such a case, the separation module 205 may create two sets of data: one set for user identifiable information and one set for anonymized network information. The user identifiable information may, for instance, be stored in the identifiable information database 117, and the anonymized network information may be stored in the anonymized information database 115.

The separation module 205 may also include a detection means for determining whether a particular type of information (e.g., mobile directory number) is user identifiable or anonymized network information. In one embodiment, the detection means is achieved by service provider settings and/or user privacy and permissions settings stored in the permissions database 113. It is contemplated that privacy and permissions settings may be stored in various locations, for example, the service provider network 111. In another embodiment, the detection means may be achieved using markers or semantic tags for each information type.

The key module 207 may be utilized to generate a key to associated user identifiable information stored in the identifiable information database 117 with anonymized network information stored in the anonymized information database 115. In one embodiment, the network information platform 103 receives user identifiable information and anonymized network information, appends the correlation key to each set of information, and respectively stores the information sets in the identifiable information database 117 and the anonymized information database 115. In another embodiment, the key module 207 stores the user identifiable information in the identifiable information database 117 and anonymized network information in the anonymized information database 115 and appends the correlation key to each set of information when the information is requested. It is contemplated that the correlation key may be any sequence of information, for example, numeric, alpha-numeric, etc. The key module 207 may use various schemes to generate the correlation key, for example, a random number table, a true random number generator, pseudo-random number algorithm such as the linear congruential generator, or a number based on probability density functions. Additionally, the key module 207 may be enabled to prevent duplicate correlation key values by, for example, use of a central random number table, or use of a unique global identifier.

Moreover, the permissions module 209 may be used to retain each user's privacy and permissions preference. For example, a user may prefer not to share any information even when such information is anonymized. It is contemplated that multiple privacy and permissions may be available to users. In a first embodiment, for example, a user privacy and permissions preference of anonymizing all network information enables the network information platform 103 to restrict use of information collected on the user's mobile device 101 or collected from network elements, and to ensure that all network information is anonymized. In a second embodiment, for example, a user privacy and permissions preference enabling access to the network information, the anonymized network information, the user identifiable information, or a combination thereof is used to improve a user experience associated with the mobile device 101. In a third embodiment, for example, a user privacy and permissions preference may enable access to the network information, the anonymized network information, the user identifiable information, or a combination thereof to one or more third parties. Additionally, the privacy and permissions preference of each user may be stored and retrieved from a permissions database 113.

Furthermore, the access manager 211 may control access to anonymized network information received from mobile devices 101. In one embodiment, the access manager 211 may use the permissions database 113 to determine the privacy setting of the network information requested. User privacy settings may allow access to some network information (e.g., user's location), but not other information (e.g., user's calendar). The determination of privacy setting of network information may be enabled, for example, by appending the privacy setting to the anonymized network information stored in the anonymized information database 115. Alternatively, the anonymized network information stored in the anonymized information database 115 may be categorized by privacy setting. Additionally, or alternatively, a log may be configured to contain only information allowed by user privacy settings, such that a requester having access to some information in a particular log has access to all information stored in the particular log.

In another embodiment, the access manager 211 may be configured to enable emergency event network optimization. For example, in one embodiment the access manager 211 receives authentication information from a requester, and determines whether the requester is authorized to receive user identifiable information. The determination that a request is authorized enables emergency event network optimization that may include, for example, quality of service (QoS) treatment for emergency responders, and source identification of emergency communications (e.g., mobile directory number of a 911 call, location). It is contemplated that authenticating information may include, for example, a username and password procedure, a code (e.g., personal identification number (PIN), etc.). Additionally, or alternatively, authenticating information may be encrypted, either symmetrically or asymmetrically, such that a hash value can be utilized to authenticate received control signals. As such, communications between a requester and network information platform 103 may include various identifiers, keys, random numbers, random handshakes, digital signatures, and the like.

Figure 3:
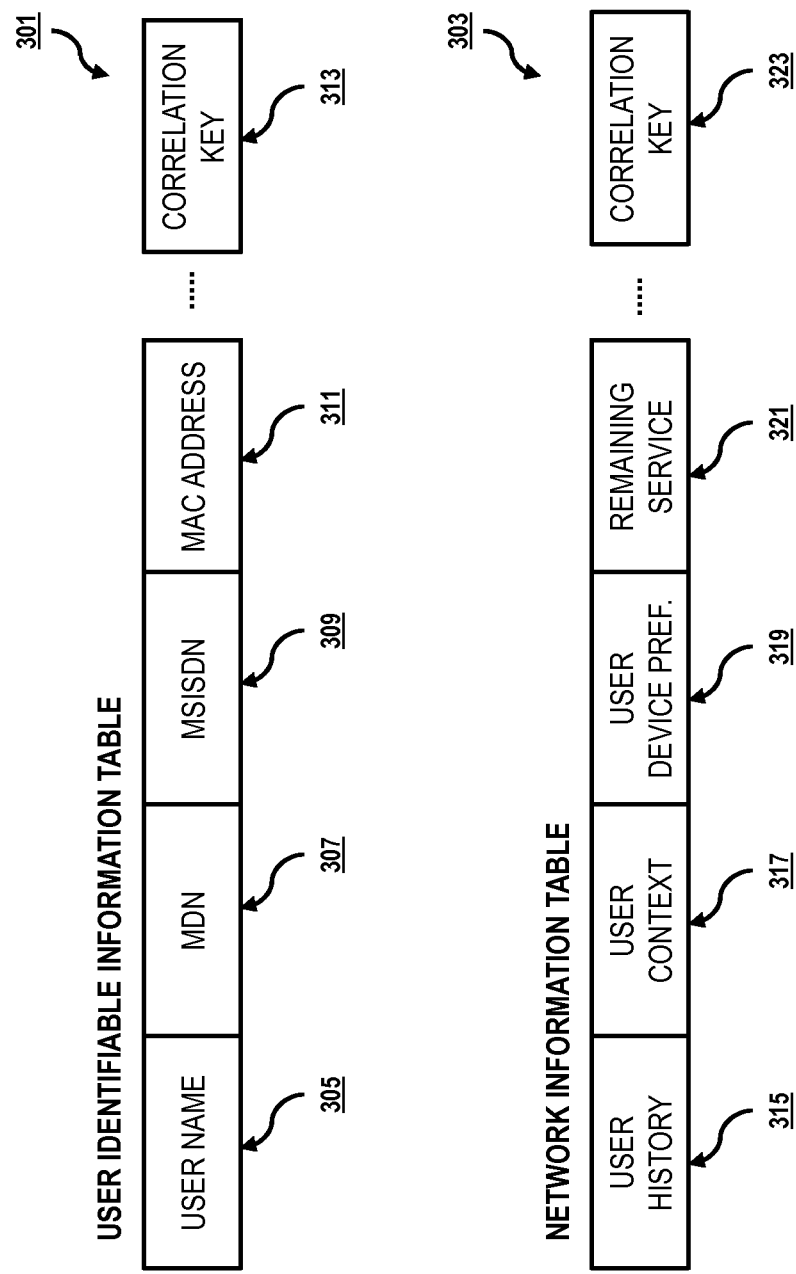
FIG. 3 is a diagram of formats for user identifiable and network information tables, according to an exemplary embodiment.

FIG. 3 is a diagram of formats for user identifiable and network information tables, according to an exemplary embodiment. As shown, FIG. 3 illustrates formats for a user identifiable information table 301 and an anonymized network information table 303. In one embodiment, the identifiable information database 117 contains information shown in table 301, for example, user name 305, mobile directory number (MDN) 307, Mobile Subscriber Integrated Services Digital Network Number (MSISDN) 309, media access control (MAC) address 311, correlation key 313, and the like.

The user identifiable information may be determined by, for example, the network information platform 103. By way of example, the user name 305 may be information that directly identifies the user of a mobile device. The collection of user name 305 may raise privacy concerns because it may be used to facilitate the collecting of information on an individual. The mobile directory number 307 may be a unique identifier used to initiate a call with the mobile device 101 associated with the dialed mobile directory number 307. The collection of mobile directory number 307 may raise privacy concerns because it may be used to generate and/or update a call list, for example, to facilitate sales calls. The MSISDN 309 may be a number uniquely identifying a subscription in a mobile network. The collection of MSISDN 309 may raise privacy concerns because it may be used to facilitate location tracking of the device user. The MAC address 311 may be a unique identifier assigned to a network interface for communications. The collection of MAC address 311 may raise privacy concerns because it may be used to facilitate location tracking of the device user.

Likewise, the anonymized information database 115 may contain information shown in table 303, for example user history 315, user context data 317, user device preferences 319, remaining service 321, a correlation key 323, and the like. The user history 315 may include, for example, location, and network usage history. The collection of user history 315 may be used to improve user experience without exposing personal information by collecting only information relating to data use. For example, the information collected may relate only to an anonymous device with a network usage history of low data use connected to a specific access point. This information may be used in capacity planning and network resource optimization. The user context data 317 may include, for example, a user's calendar, a user's presence state, and a user's network preferences (e.g., WiFi vs. private network access). The collection of user context data 317 may be used to improve user experience without exposing personal information by collecting only information relating to data use. For example, the information collected may relate only to an anonymous device that typically accesses the network with private network access from 8 A.M. to 7 P.M., Monday through Friday. This information may be used in capacity planning and network resource optimization. The user device preferences 319 may include, for example, a user's preferred type of connection (e.g., 4G, 3G, or 2G). The collection of user device preferences 319 may be used to improve user experience without exposing personal information by collecting only information relating to data use. This information may be used in capacity planning and network resource optimization. The remaining service 321 may include, for example, the remaining minutes of use, and the remaining amount of data use. The collection of remaining service 321 may be used to improve user experience without exposing personal information by collecting only information relating to data use. This information may be used in capacity planning and network resource optimization.

Figure 4:
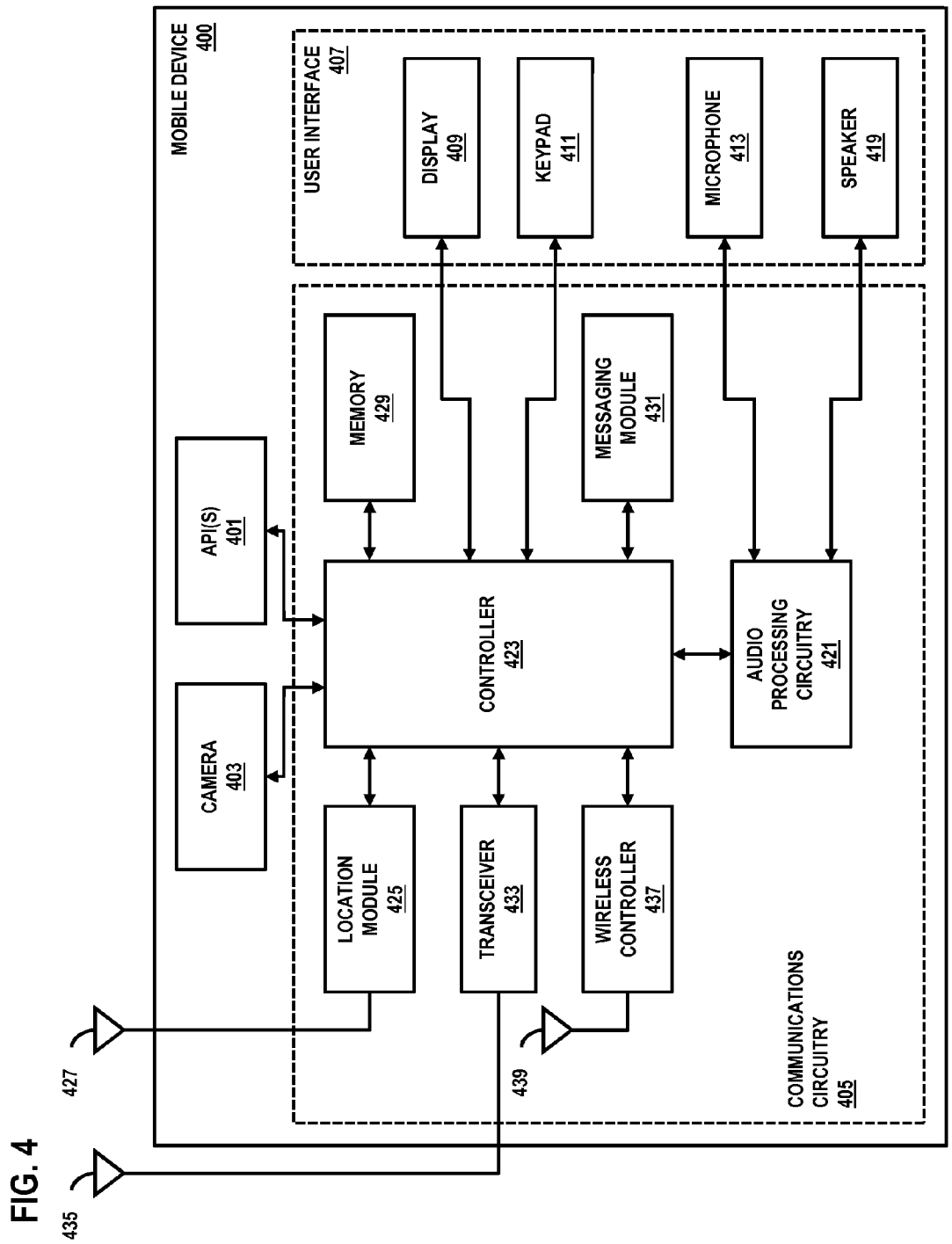
FIG. 4 is a diagram of a mobile device configured to facilitate network information collection and access control, according to an exemplary embodiment.

FIG. 4 is a diagram of a mobile device configured to facilitate network information collection and access control, according to an exemplary embodiment. Mobile device 400 (e.g., equivalent to the mobile device 101) may comprise computing hardware (such as described with respect to FIG. 10), as well as include one or more components configured to execute the processes described herein for facilitating the remote tracking services of system 100. In this example, mobile device 400 includes application programming interface(s) 401, camera 403, communications circuitry 405, and user interface 407. While specific reference will be made hereto, it is contemplated that mobile device 400 may embody many forms and include multiple and/or alternative components.

According to exemplary embodiments, user interface 407 may include one or more displays 409, keypads 411, microphones 413, and/or speakers 419. Display 409 provides a graphical user interface (GUI) that permits a user of mobile device 400 to view dialed digits, call status, menu options, and other service information. Specifically, the display 409 may allow viewing of, for example, privacy settings (e.g. anonymize all my network information). The GUI may include icons and menus, as well as other text and symbols. Keypad 411 includes an alphanumeric keypad and may represent other input controls, such as one or more button controls, dials, joysticks, touch panels, etc. The user thus can construct user profiles, enter commands, initialize applications, input remote addresses, select options from menu systems, and the like. Specifically, the keypad 411 may enable the inputting of privacy settings (e.g. anonymize all my network information). Microphone 413 coverts spoken utterances of a user (or other auditory sounds, e.g., environmental sounds) into electronic audio signals, whereas speaker 419 converts audio signals into audible sounds. Similar to the displays 409, the speaker 419 may enable the mobile device 400 to alert the user of privacy settings (e.g. anonymize all my network information). Likewise, the microphone 413 may allow inputting privacy settings (e.g. anonymize all my network information).

A camera 403 may be used as an input device to, for example, collect data that is overlaid on a map. Additionally, or alternatively the camera 403 may be used to generate an augmented reality that may viewed on display 409. The augmented reality may be facilitated by the use of additional hardware such as micro electro-mechanical (MEMS) sensors such as accelerometers, solid state compasses, network-based image recognition and augmentation, etc.

Communications circuitry 405 may include audio processing circuitry 421, controller 423, location module 425 (such as a GPS receiver) coupled to antenna 427, memory 429, messaging module 431, transceiver 433 coupled to antenna 435, and wireless controller 437 coupled to antenna 439. Memory 429 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 429 may be implemented as one or more discrete devices, stacked devices, or integrated with controller 423. Memory 429 may store information, such as one or more user profiles, one or more user defined policies, one or more contact lists, personal information, sensitive information, work related information, etc. As previously noted, it is contemplated, that functions performed by the network information platform 103 may be performed by the mobile device 400. For example, the separation of user identifiable and network information may be performed by the mobile device 400, by separately storing user identifiable information from network information. Additionally, user privacy settings may be stored in memory 429.

Additionally, it is contemplated that mobile device 400 may also include one or more applications and, thereby, may store (via memory 429) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, signals received by mobile device 400 from, for example, network information platform 103 may be utilized by API(s) 401 and/or controller 423 to facilitate the sharing of information, and improving the user experience.

Accordingly, controller 423 controls the operation of mobile device 400, such as in response to commands received from API(s) 401 and/or data stored to memory 429. Control functions may be implemented in a single controller or via multiple controllers. Suitable controllers 423 may include, for example, both general purpose and special purpose controllers and digital signal processors. Controller 423 may interface with audio processing circuitry 421, which provides basic analog output signals to speaker 419 and receives analog audio inputs from microphone 413.

It is noted that real time spatial positioning information may be obtained or determined via location module 425 using, for instance, satellite positioning system technology, such as global positioning system (GPS) technology. In this way, location module 425 can behave as (or substantially similar to) a GPS receiver. Thus, mobile device 400 employs location module 425 to communicate with constellation of satellites. The location module 425 may facilitate the collection of network information, by allowing the mobile device 101 to detect the device location to associate with other network information detected by the mobile device 101 such as, for example, signal strength, capacity, latency, and data rate. These satellites transmit very low power interference and jamming resistant signals received by GPS receivers in the location module 425 via, for example, antennas 427. At any point on Earth, GPS receiver in location module 425 can receive signals from multiple satellites, such as six to eleven. Specifically, GPS receiver in location module 425 may determine three-dimensional geolocation (or spatial positioning information) from signals obtained from at least four satellites. Measurements from strategically positioned satellite tracking and monitoring stations are incorporated into orbital models for each satellite to compute precise orbital or clock data.

Accordingly, GPS signals may be transmitted over two spread spectrum microwave carrier signals that can be shared by GPS satellites. Thus, if mobile device 400 is able to identify signals from at least four satellites, the location module 425 may decode the ephemeris and clock data, determine the pseudo range for each satellite and, thereby, compute the spatial positioning of a receiving antenna 427. With GPS technology, mobile device 300 can determine its spatial position with great accuracy and convenience. It is contemplated, however, that location module 425 may utilize one or more other location determination technologies, such as advanced forward link triangulation (AFLT), angle of arrival (AOA), assisted GPS (A-GPS), cell identification (cell ID), observed time difference of arrival (OTDOA), enhanced observed time of difference (E-OTD), enhanced forward link trilateration (EFLT), network multipath analysis, and the like. As such, a location module 425 can be utilized to determine the mobile device 400 location to facilitate enhancing the user's experience, for example, in determining position for augmented reality, optimizing radio antenna configurations, and predicting locomotion for anticipating handoffs.

Mobile device 400 also includes messaging module 431 that is configured to receive, transmit, and/or process messages (e.g., enhanced messaging service (EMS) messages, SMS messages, MMS messages, instant messaging (IM) messages, electronic mail messages, and/or any other suitable message) received from (or transmitted to) network information platform 103 or any other suitable component or facility of system 100. As such, messaging module 431 may be configured to receive, transmit, and/or process information shared by the mobile device 400. For example, network information platform 103 can send an SMS "ask" to a user to request access by an application to user network information.

It is also noted that mobile device 400 can be equipped with wireless controller 437 to communicate with a wireless headset (not shown) or other wireless network. The headset can employ any number of standard radio technologies to communicate with wireless controller 437; for example, the headset can be Bluetooth enabled. It is contemplated that other equivalent short range radio technology and protocols can be utilized. While mobile device 400 has been described in accordance with the depicted embodiment of FIG. 4, it is contemplated that mobile device 400 may embody many forms and include multiple and/or alternative components.

Figure 5A:
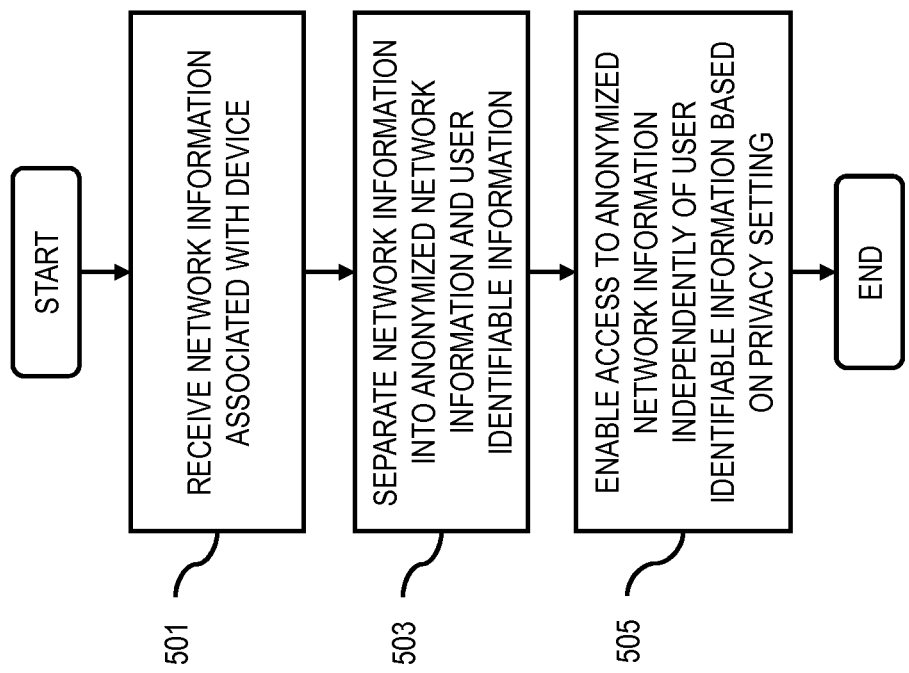
FIGS. 5A and 5B are flowcharts for providing network information collection and access control, and for accessing user identifiable information, respectively, according to various exemplary embodiment.

FIG. 5A is a flowchart of a process for providing network information collection and access control, according to an exemplary embodiment. For illustrative purposes, the process is described with respect to FIGS. 1 and 2. It is noted that the steps of the process may be performed in any suitable order, as well as combined or separated in any suitable manner. In addition, or alternatively, all or a portion of the process of FIG. 5A may be performed by the mobile devices 101, or the network information platform 103.

At step 501, the network information platform 103 receives network information associated with a device, for instance, from a mobile device 101 to be shared. The network information platform 103 then, at step 503, separates the network information into anonymized network information and user identifiable information. As discussed, the anonymized network information may be stored in the anonymized information database 115 and the user identifiable information may be stored in the identifiable information database 117 for future access. Accordingly, at step 505, the network information platform 103 enables access to the anonymized network information independently of the user identifiable information based on a privacy setting.

By way of example, privacy settings may be maintained by associating the network information with particular privacy settings. The privacy settings (e.g., anonymize all my network information) may, for instance, be appended to the network information. Additionally, or alternatively, the privacy settings may be stored in respective logs. In one scenario, one or more logs may store only information related to a first privacy setting (e.g., anonymize all my network information), and a different set of one or more logs may store only information related to a second privacy setting (e.g., enabling access to the network information, the anonymized network information, the user identifiable information, or a combination to thereof to improve a user experience associated with the device). Moreover, in certain embodiments, privacy settings may enable access to network information, the anonymized network information, and/or the user identifiable information based on groups or categories of requesters (e.g., third party, service provider, etc.).

Figure 5B:
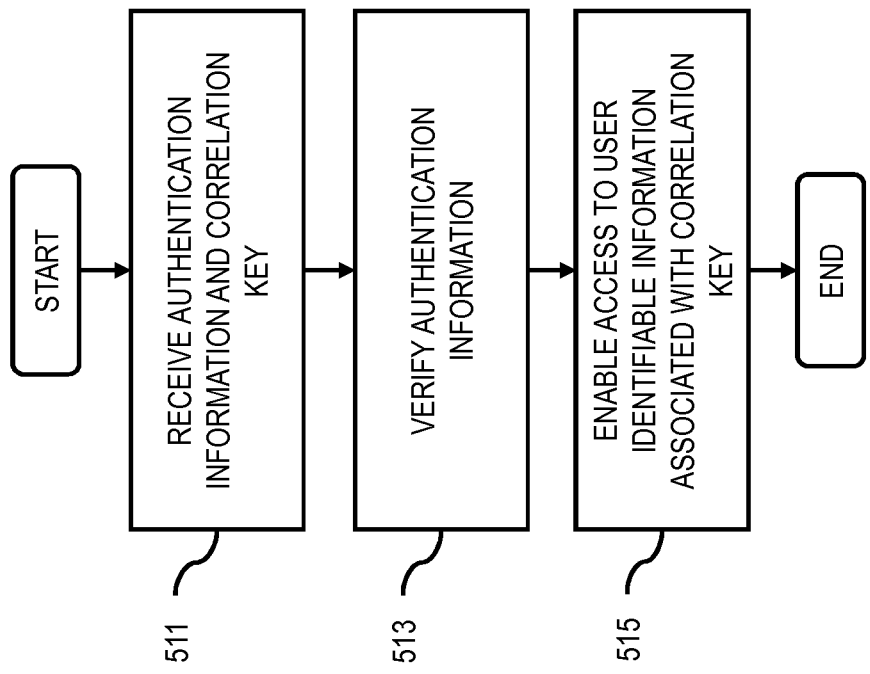

FIG. 5B is a flowchart of a process for accessing user identifiable information, according to an exemplary embodiment. For illustrative purposes, the process is described with respect to FIGS. 1 and 2. It is noted that the steps of the process may be performed in any suitable order, as well as combined or separated in any suitable manner. In addition, or alternatively, all or a portion of the process of FIG. 5B may be performed by the mobile devices 101, or the network information platform 103.

At step 511, the network information platform 103 receives authentication information and a correlation key, for instance, from a requester (e.g., associated with the mobile device 101). It is contemplated that the authentication information and correlation key may, for instance, be entered via a web portal by a user. Additionally, or alternatively, the authentication information and the correlation key may be entered into and sent using a mobile device 101. Additionally, or alternatively, the authentication information and the correlation key may be requested by a service or application by communicating with the network information platform 103. By way of example, the correlation key may enable the use of emergency event network optimization. Emergency event network optimization may include, for example, quality of service (QoS) treatment for emergency responders, and source identification of emergency communications (e.g., mobile directory number of an emergency call).

Once the network information platform 103 receives the authentication information and the correlation key, it may, as in step 513, verify the authentication information. In one scenario, the network information platform 103 reads an authentication information log containing authentication information and compares the authentication information in the log to the authentication information received.

At step 515, the network information may then enable access to user identifiable information associated with the received correlation key. For example, the network information platform 103 may locate the user identifiable information in the identifiable information database 117 using the received correlation key (e.g., by locating a matching correlation key in the identifiable information database 117). The user identifiable information may then be sent to the sender of the authentication information and the correlation key (e.g., the requester). As mentioned, the correlation keys may, for instance, be amended to individual network information sets (e.g., anonymized network information, user identifiable information, etc.) stored in respective databases (e.g., the anonymized information database 115, the identifiable information database 117, etc.). Additionally, or alternatively, the correlation keys associated with the respective network information sets may be stored in a separate database (e.g., the permissions database 113) and amended to the network information sets when requested.

Figure 6A:
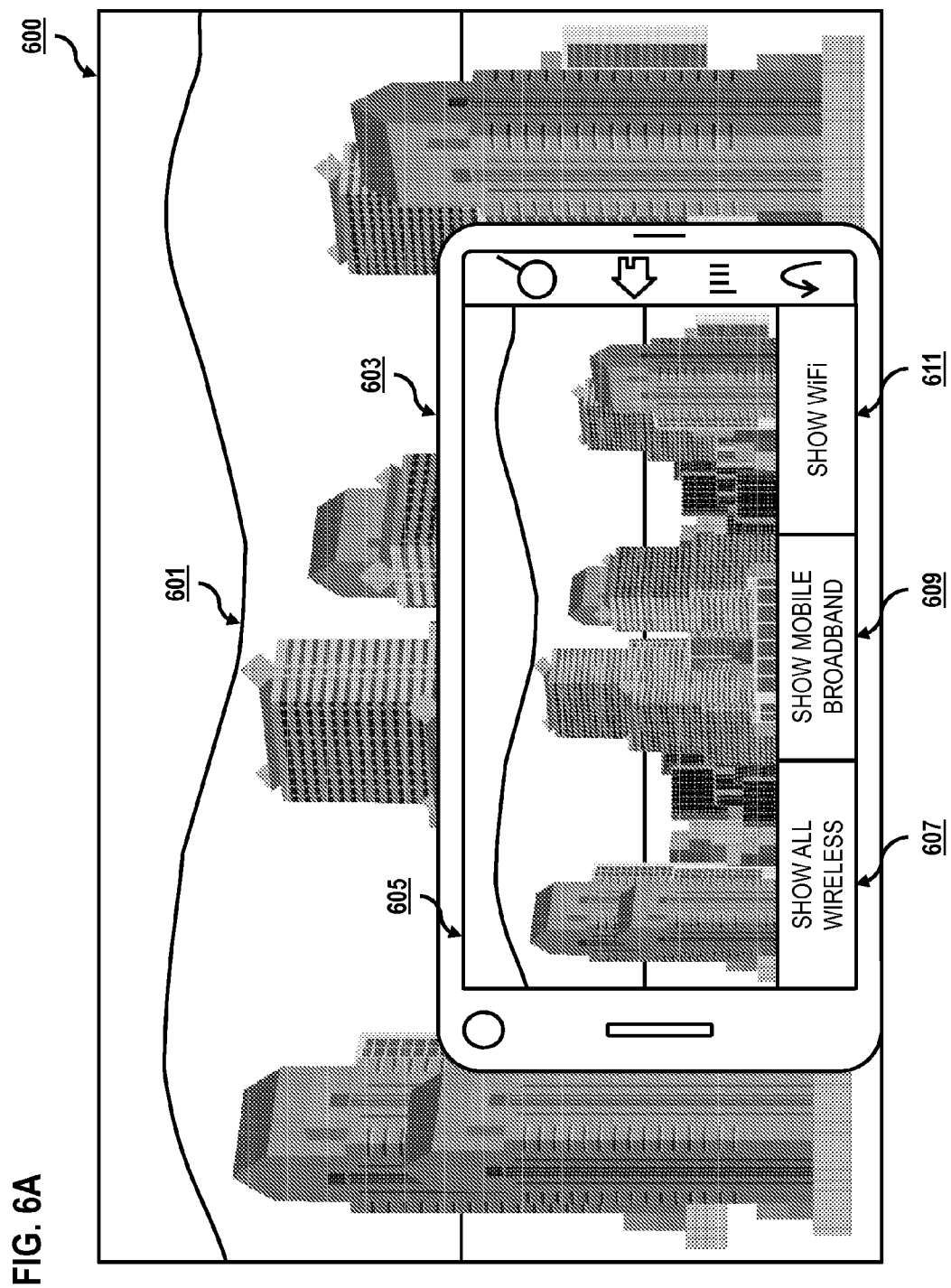
FIGS. 6A-6C are schematic representations of a use case for anonymized network information, according to various exemplary embodiments.
Figure 6B:
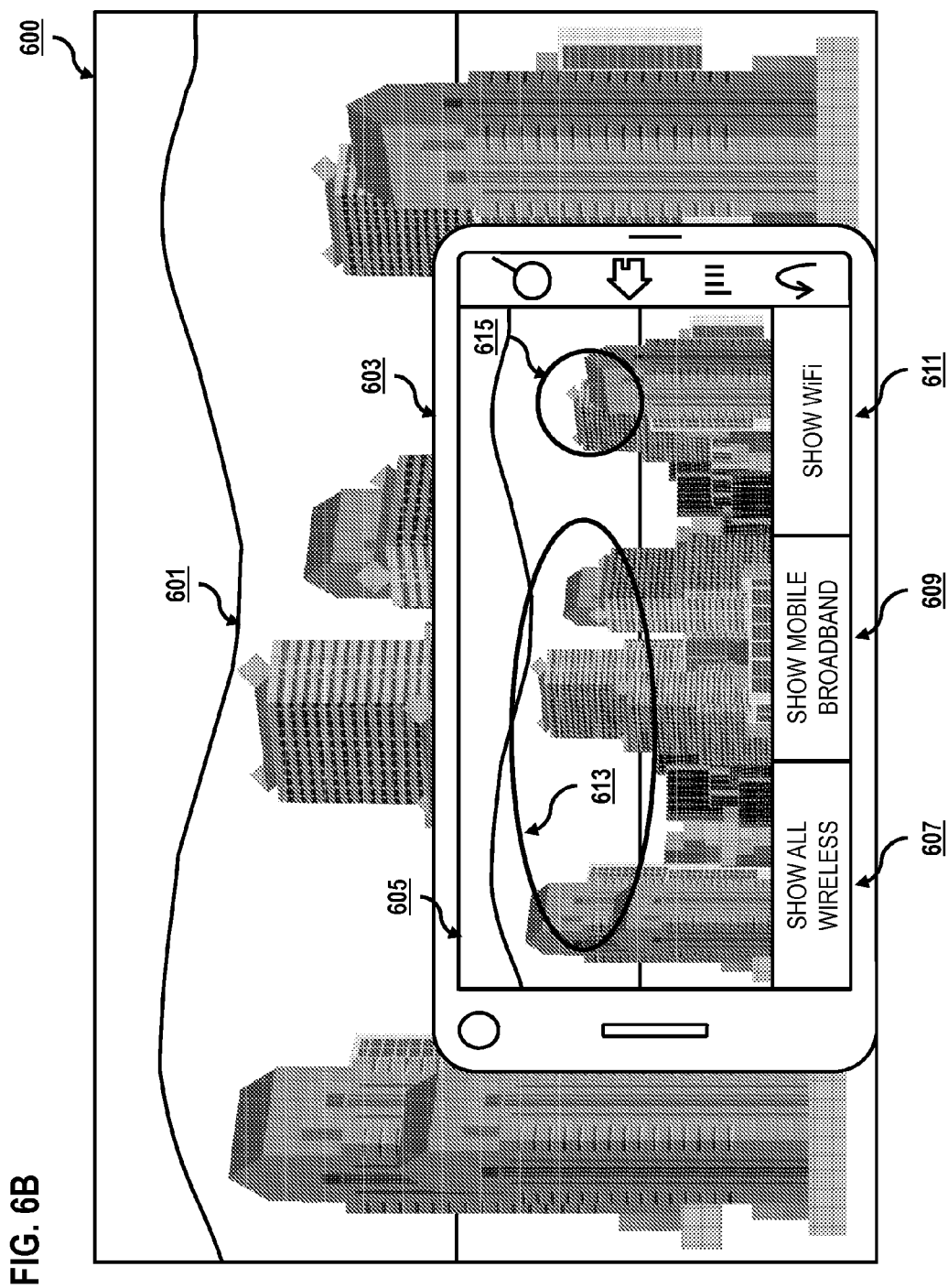
Figure 6C:
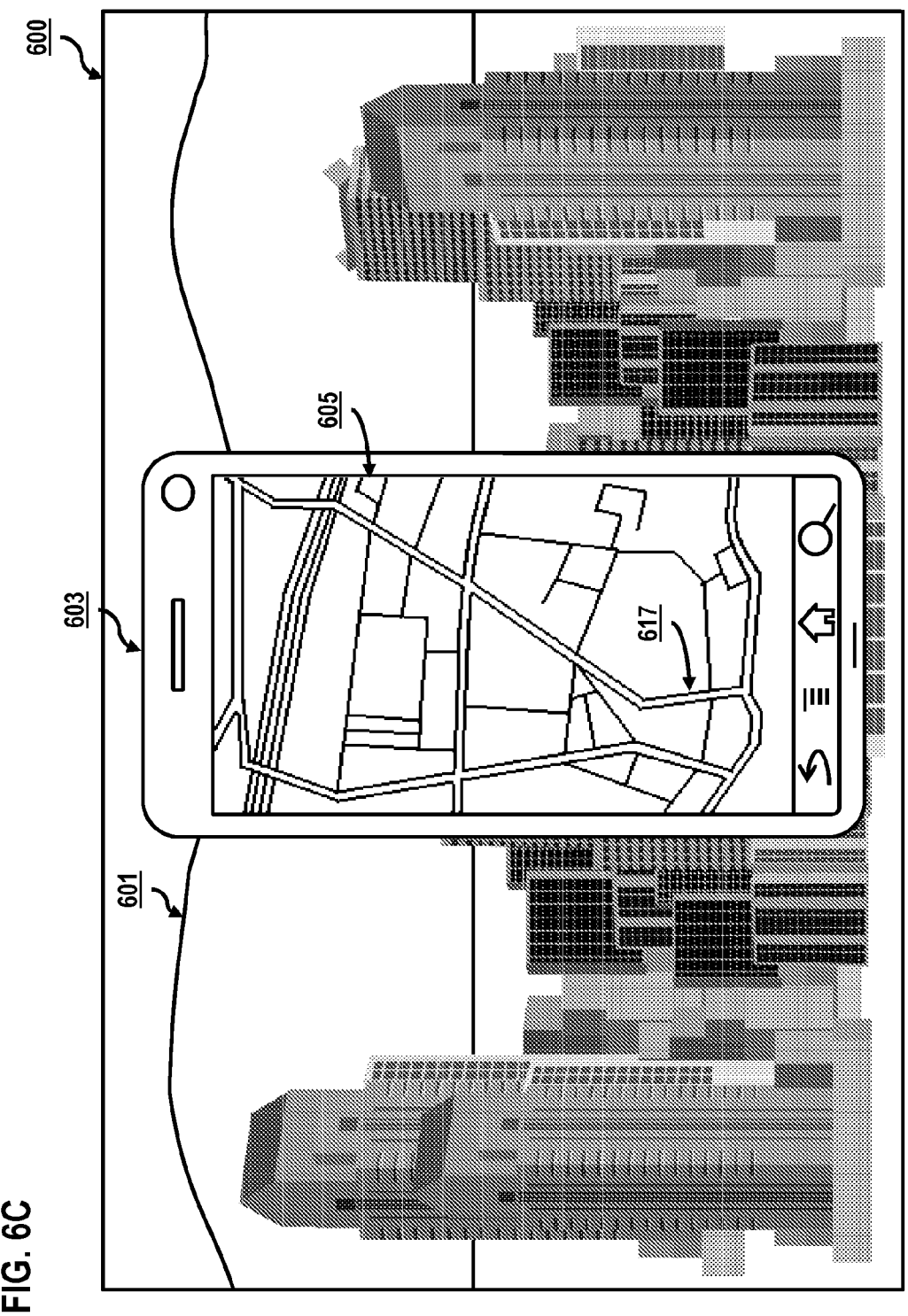

FIGS. 6A-6C are schematic representations of a use case for anonymized network information, according to various exemplary embodiments. Specifically, FIG. 6A illustrates an exemplary use of augmented reality shown at time $t_0$, wherein the mobile device 101 overlays selectable options on a detected image and displays selectable options. FIG. 6B illustrates an additional exemplary use of augmented reality shown at time $t_1$, wherein network access points are overlaid on an image detected from a built-in camera on the mobile device 101. FIG. 6C illustrates an exemplary use of motion sensors built-in a mobile device shown at time $t_2$, wherein shifting the mobile device 101 from a horizontal position to a vertical position causes the mobile device 101 to display alternate information, such as a map representing the geographical area previously displayed.

The network information platform 103 enables anonymized network information to be collected and facilitates the use of augmented reality. In one embodiment, the network information platform 103 may collect network information from the mobile devices 101, and make anonymized network information available. Additionally, the network information platform 103 may be accessed by the mobile devices 101 or a server hosting an augmented reality network information service in service provider network 111 to enable the mobile devices 101 access to anonymized network information such as, for example, access point type (e.g., mobile broadband 3G, 4G, WiFi), signal strength, data rate, latency, price, and available capacity which can be overlaid on a map. It is noted that pricing may be dynamically adjusted to reflect market changes, such as capacity, time of day, etc.

As illustrated in FIG. 6A, an exemplary use of augmented reality 600 includes a detectable image 601 such as a city skyline and a mobile device 603 (e.g., mobile device 101) shown at time $t_0$, wherein the mobile device 603 overlays selectable options on a video stream on the mobile device 603. The mobile device 603 contains a touch sensitive display 605 that can detect a user input and display selectable options 607, 609 and 611. In an exemplary embodiment, selectable option 607 displays "Show All Wireless," selectable option 609 displays "Show Mobile Broadband," and selectable option 611 displays "Show WiFi." The touch sensitive display 605 may detect the selection of one of the options 607, 609 and 611 and cause the screen to display the requested information on the touch sensitive display 605. It is contemplated that the options displayed may be varied. Additionally, the detectable image 601 may be displayed as a static image captured by mobile device 603, or the detectable image 601 may be detected and displayed in real-time.

FIG. 6B illustrates an additional exemplary use of augmented reality shown at time $t_1$, wherein network access points are overlaid on a video stream detected from a built-in camera on the mobile device 603 and augmented in near real-time for display on device 603. In response to the detection of a user input at time $t_0$ (e.g., option 607), the touch sensitive display 605 displays augmentation 613 and augmentation 615. The mobile device 603 may also detect a user input on the touch sensitive display 605 selecting one or more augmentations, such as augmentation 613 and augmentation 615, associated with the network access points and/or network information. In response to the detection of a user input (e.g., augmentation 613) the touch sensitive display 605 displays general information related to the selected augmentation, for example, directions to get to the access point, network distance, operator, price, and data speeds. It is contemplated that the augmentations may, for instance, be distinguished by altering shadings, colors, transparency, icons, and styles of borders and fills of the augmentations. For example, augmentation 613 may have a fill shading of yellow and augmentation 615 may have a fill shading of red.

As illustrated in FIG. 6C, motion sensors built-in mobile device 603 may detect the shifting from a horizontal position to a vertical position, and at time $t_2$, causes the touch sensitive display 605 to display alternate information, such as a map 617 representing the geographical area previously displayed.

Figure 7:
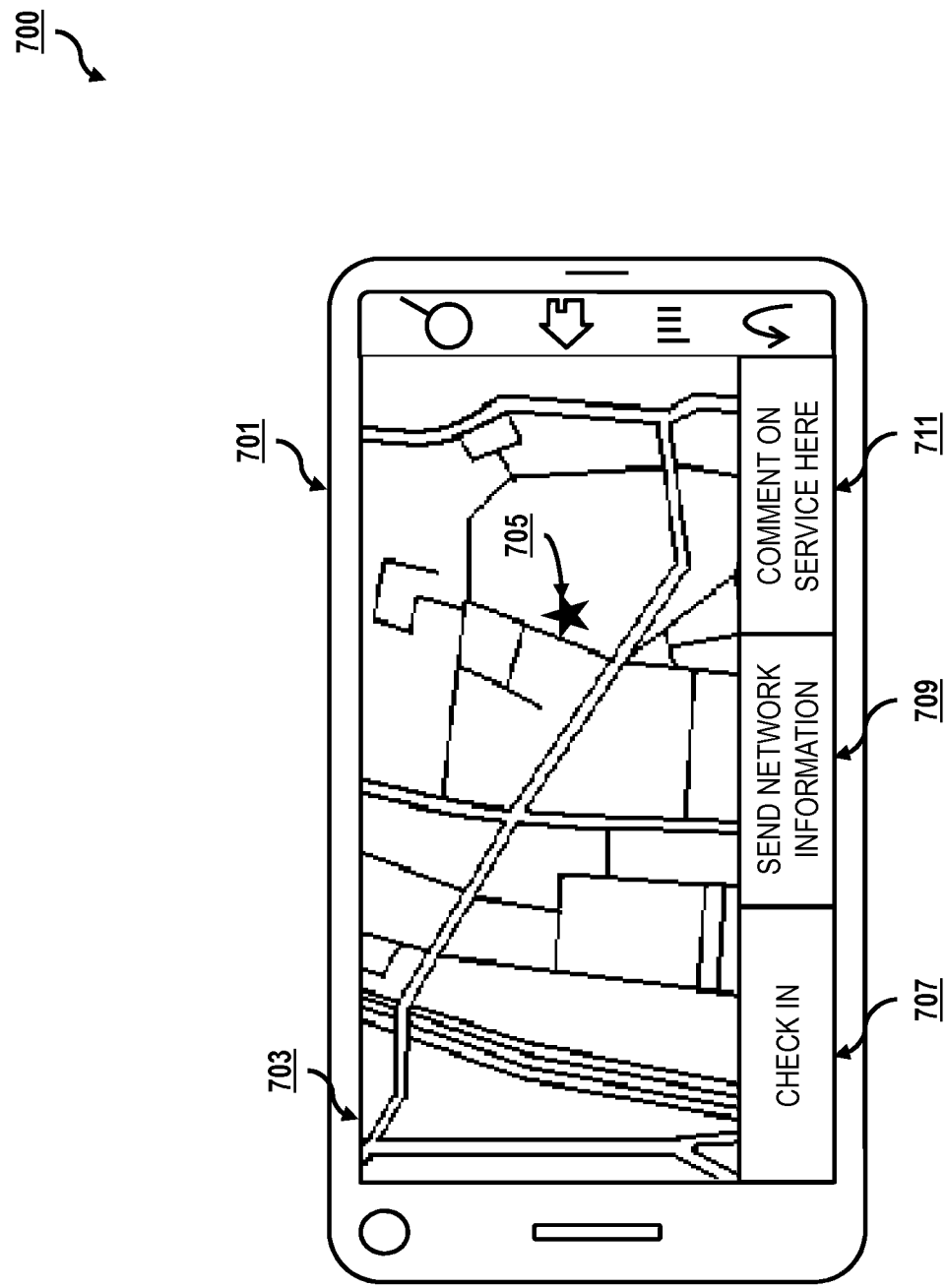
FIG. 7 is a diagram for collecting network information, according to an exemplary embodiment.

FIG. 7 is a diagram for collecting network information, according to an exemplary embodiment. As illustrated in FIG. 7, area 700 includes a mobile device 701 that initiates the input of network information by displaying on a touch sensitive display 703, a detected location 705, and selectable options 707, 709, and 711. As shown, the selectable option 707 displays "Check In," the selectable option 709 displays "Send Network Information," and the selectable option 711 displays "Comment on Service Here."

The network information platform 103 enables a mobile device (e.g., mobile device 701) to facilitate the collection of anonymized network information by initiating the input of network information. For example, if the touch sensitive display 703 detects selection of selectable option 707, it may allow the user to verify or update the accuracy of the detected location 705. Additionally or alternatively, the touch sensitive display 703 may detect a selection of selectable option 709 indicating the user granting permission to send anonymized network information using the network information platform 103. In another example, the touch sensitive display 703 detects a selection of selectable option 711 to enable the user to input comments on service. It is contemplated, that comments on service may be collected by various means, for example, an unrestricted text file, multi-selectable list boxes, or a combination thereof.

Figure 8A:
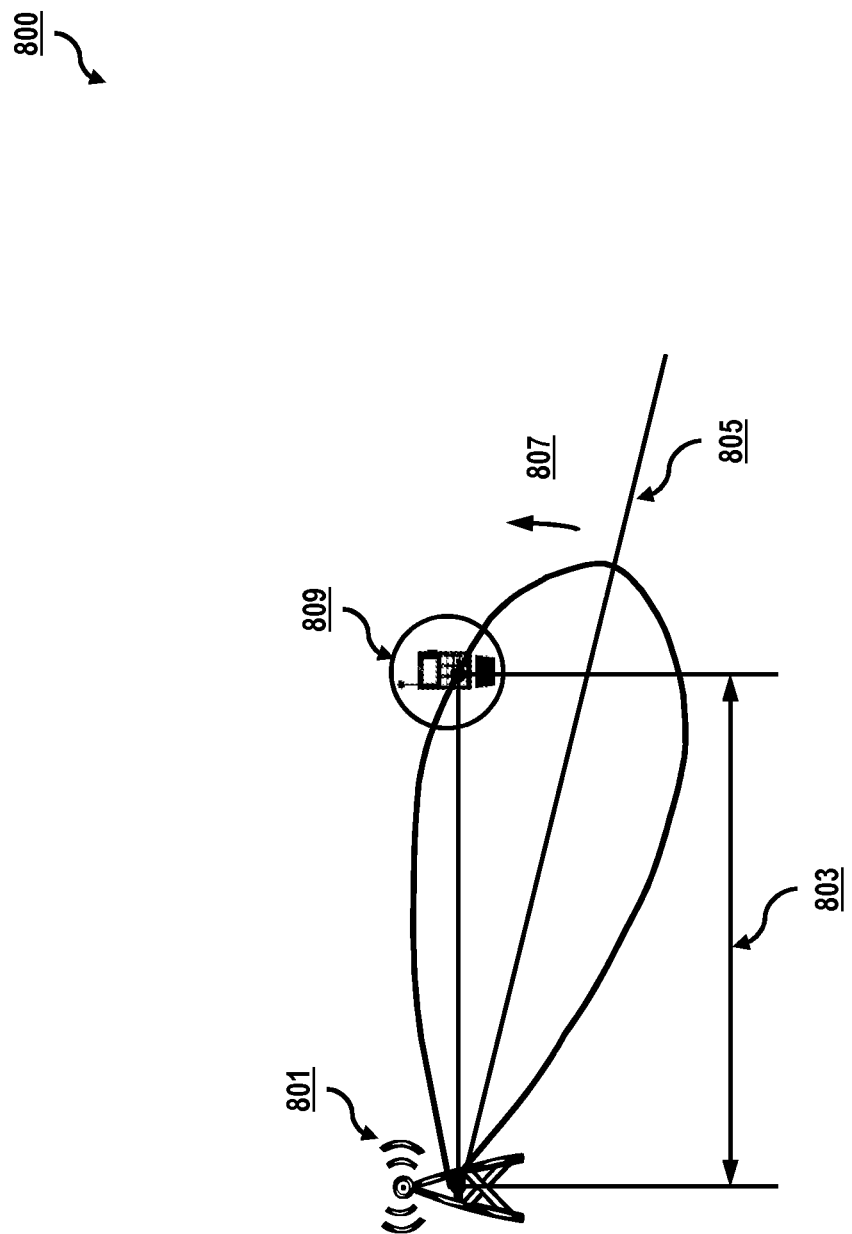
FIGS. 8A and 8B are schematic representations of a use case of collected network information, according to various exemplary embodiments.
Figure 8B:
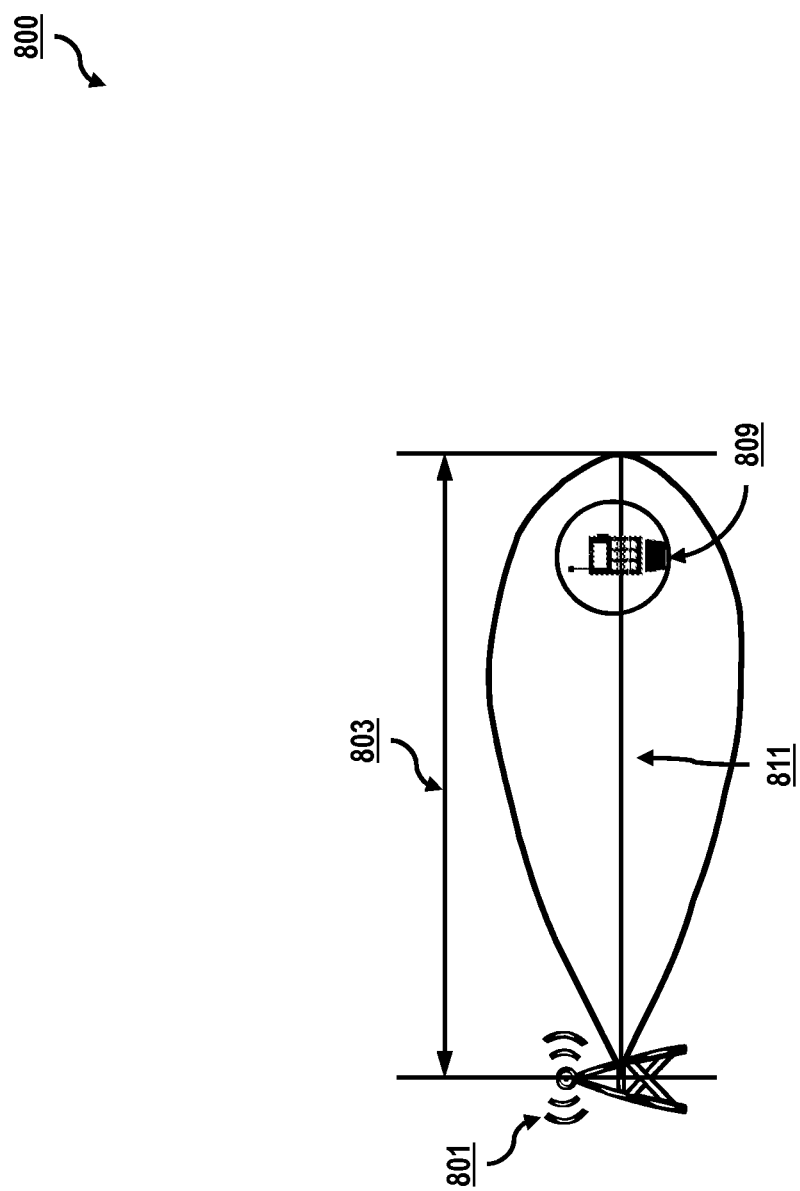

FIGS. 8A and 8B are schematic representations of a use case of collected network information, according to various exemplary embodiments. Specifically, FIG. 8A illustrates an exemplary use of network information time $t_0$ that enables improvement of the user experience. FIG. 8B illustrates the result of using the network information, wherein at time $t_1$ a radio antenna configuration is optimized to enable an improved user experience.

As illustrated in FIG. 8A, an exemplary use of anonymized network information 800 includes an antenna 801 that transmits a signal with a signal strength 803 in the shape of a lobe with a lobe axis 805 shown at time $t_0$, wherein the lobe axis 805 is moved along a direction of rotation 807 to enable improvement of the user experience at target 809 (e.g., mobile device 101). By way of example, the collection of network information may facilitate the identification of the target 809. The target location may, for instance, represent a larger number of mobile devices 101, as compared with other targets, within the range of the lobe axis 805.

As illustrated in FIG. 8B, an exemplary use of anonymized network information 800 includes an antenna 801 that transmits the signal with the signal strength 803 in the shape of a lobe with a lobe axis 811 shown at time $t_1$, wherein the lobe axis 811 is located to enable an improved user experience at the target 809. In this case, the collection of network information have facilitated the directing of an antenna beam to provide for an improved user experience at target 809 (e.g., by providing a stronger signal to the target 809).

Figure 9A:
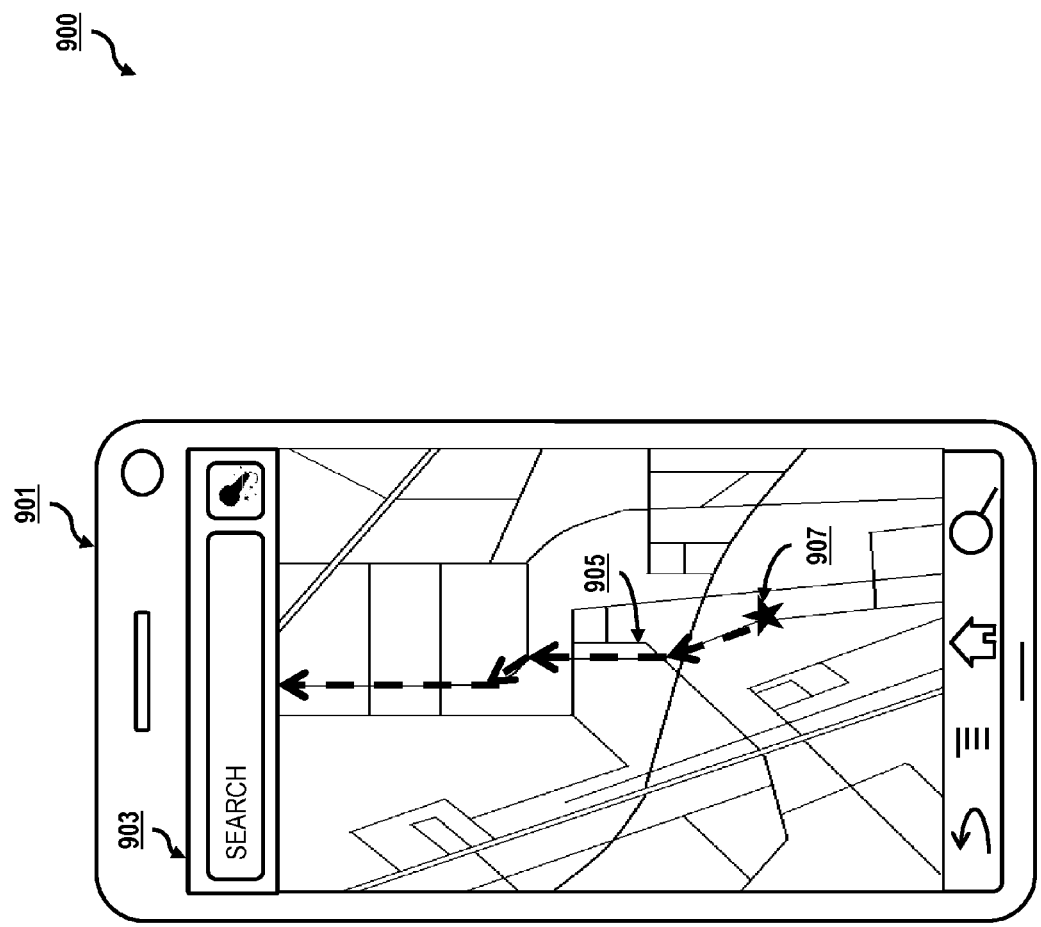
FIGS. 9A and 9B are illustrations of another use case of collected network information, according to various exemplary embodiments.
Figure 9B:
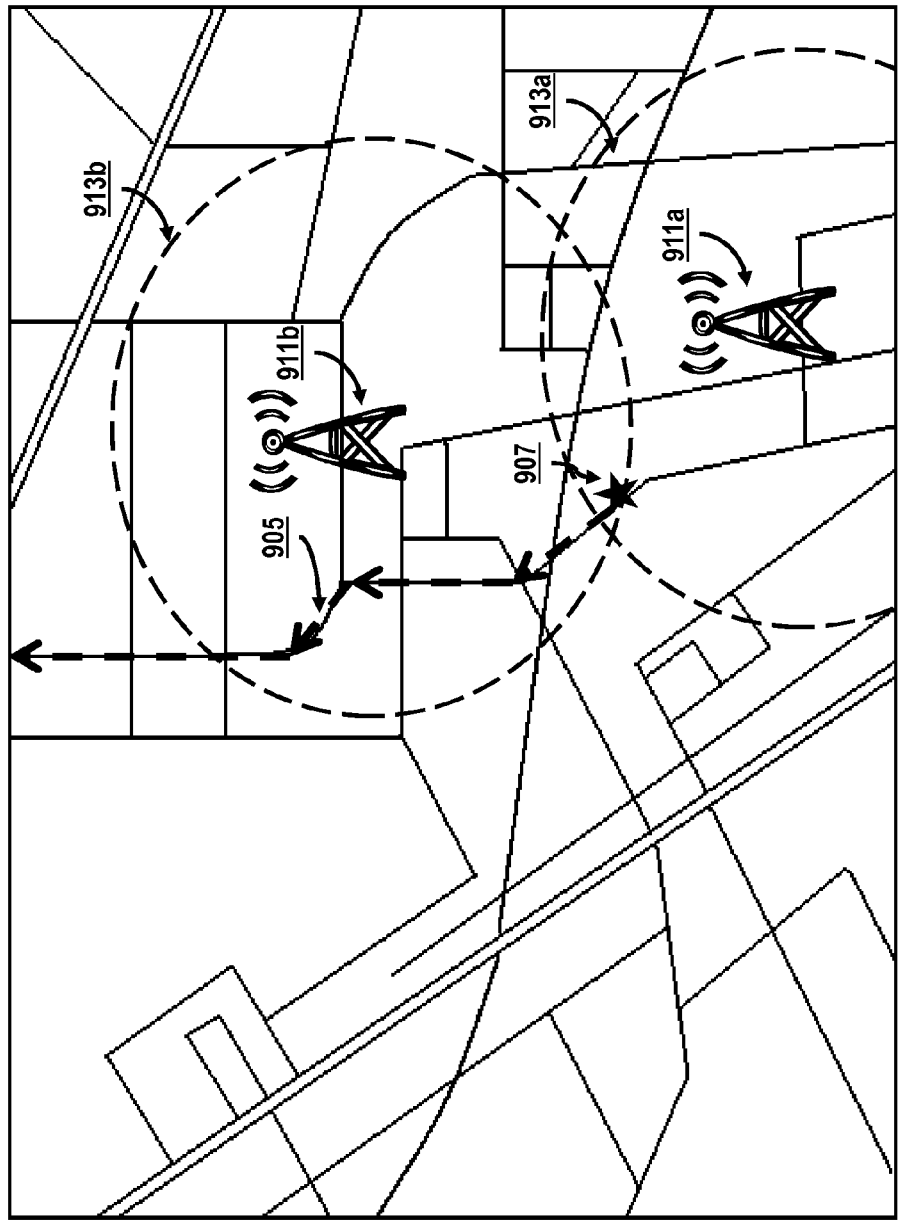

FIGS. 9A and 9B are illustrations of another use case of collected network information, according to various exemplary embodiments. Specifically, FIG. 9A illustrates an exemplary use of mobile device 101, wherein the mobile device 101 displays a route on a map. FIG. 9B illustrates how the route may appear with reference to multiple access points for the mobile device 101.

As illustrated in FIG. 9A, area 900 includes a mobile device 901 (e.g., mobile device 101) with a touch sensitive display 903 that can detect a user input such as a destination point and displays an anticipated locomotion 905. The touch sensitive display 903 may display a location 907 of the mobile device 901. The network information platform 103 may collect anonymized network information relating to, for example, the anticipated locomotion 905 of the mobile device 901.

As illustrated in FIG. 9B, area 910 includes the detected location 907, the anticipated locomotion 905, and radio network transmitters 911a and 911b. Additionally, area 910 includes a radio network transmitter range 913a of radio network transmitter 911a and a radio network transmitter range 913b of radio network transmitter 911b. The network information platform 103 enables access to the anticipated locomotion 905 of the mobile device 901, and facilitates the selection of a radio network transmitter 911 that provides improved seamless roaming and handoffs. For example, the selection of connecting to radio network transmitter 911a may become disrupted because the anticipated locomotion 905 of the mobile device 901 moves the mobile device 901 outside of the radio network transmitter range 913a of radio network transmitter 911a. Moreover, since the radio transmitter range 913b of radio network transmitter 911b encompasses a larger portion of the anticipated locomotion 905 of the mobile device 901, as compared with the radio transmitter range 913a of the radio network transmitter 911a, the radio network transmitter 911b may offer improved seamless roaming and handoffs. That is, the network information platform 103 enables the mobile device 901 to be connected to the radio network transmitter 911 (e.g., the radio network transmitter 911b) which will offer better seamless roaming and handoffs for the anticipated locomotion 905.

Figure 10:
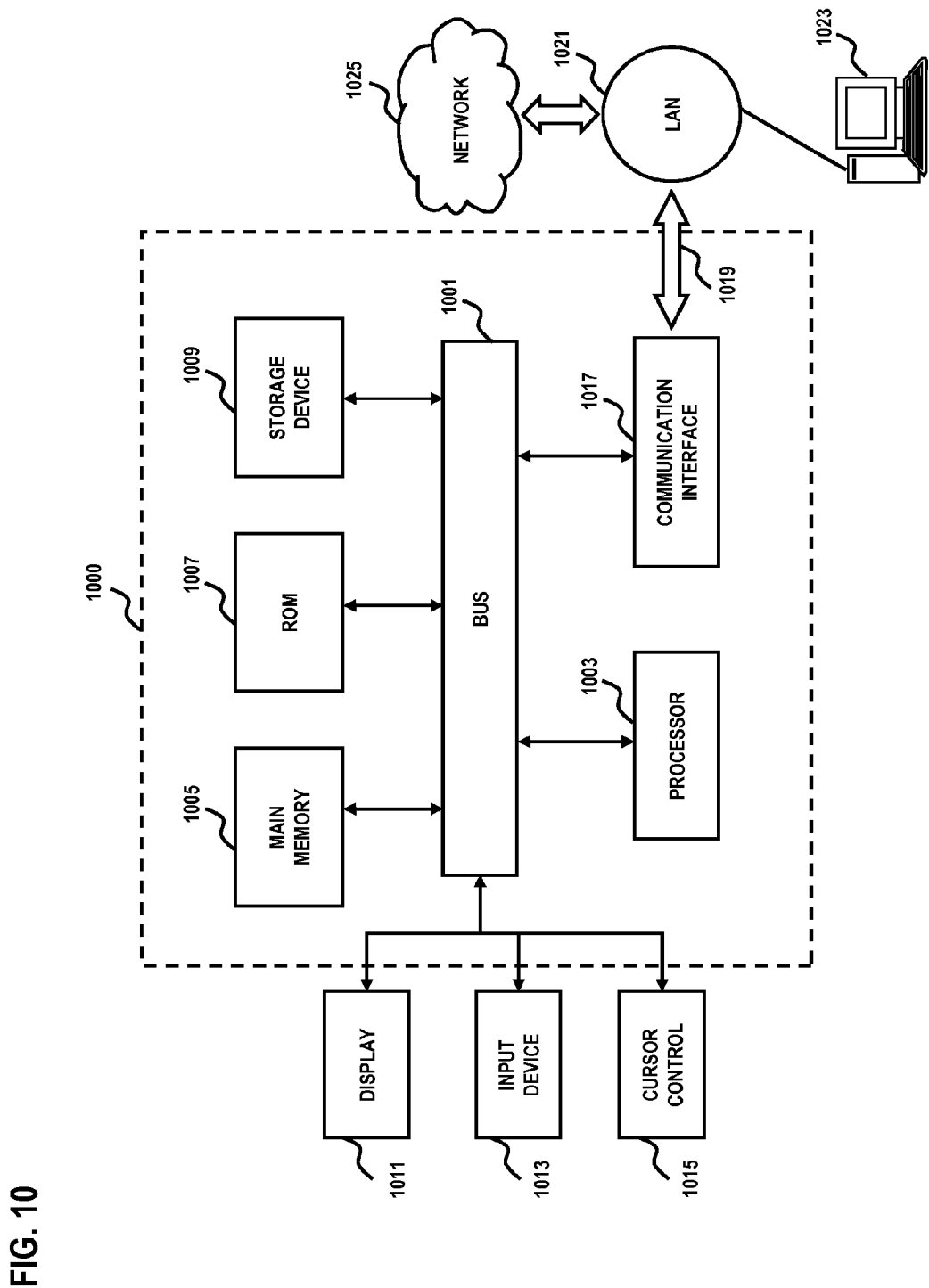
FIG. 10 is a diagram of a computer system that can be used to implement various exemplary embodiments.

FIG. 10 is a diagram of a computer system that can be used to implement various exemplary embodiments. The computer system 1000 includes a bus 1001 or other communication mechanism for communicating information and one or more processors (of which one is shown) 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk, flash storage, or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. Additional output mechanisms may include haptics, audio, video, etc. An input device 1013, such as a keyboard including alphanumeric and other keys, is coupled to the bus 1001 for communicating information and command selections to the processor 1003. Another type of user input device is a cursor control 1015, such as a mouse, a trackball, touch screen, or cursor direction keys, for communicating direction information and command selections to the processor 1003 and for adjusting cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
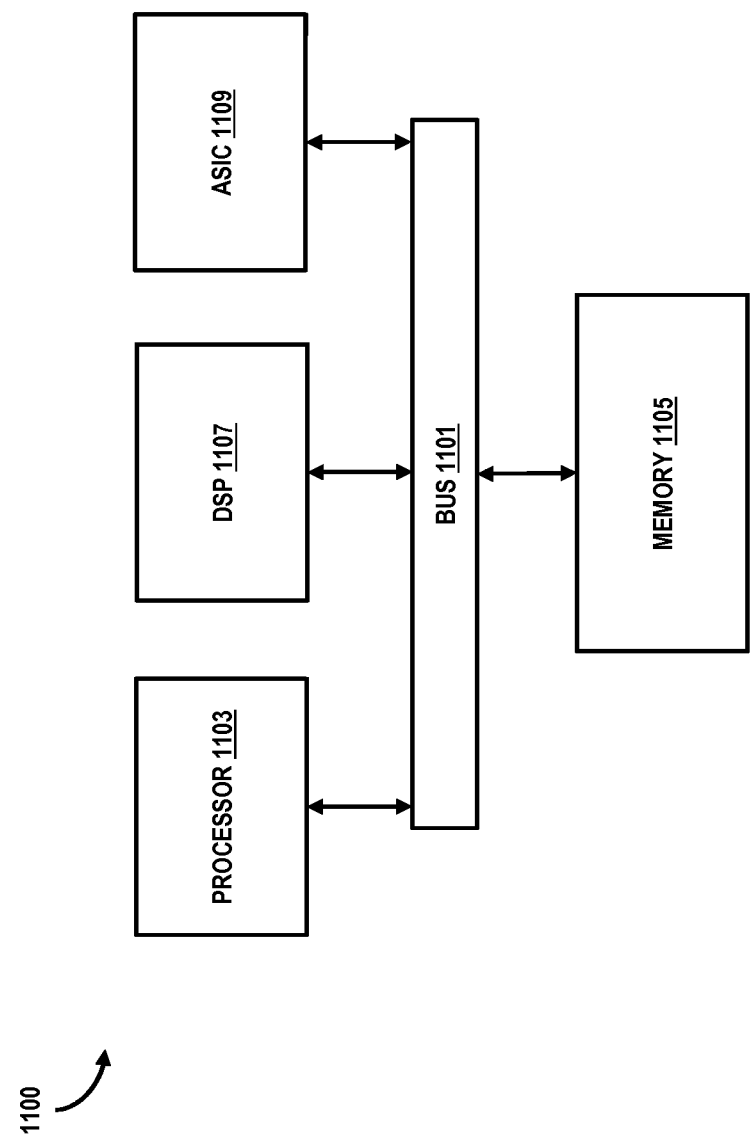
FIG. 11 is a diagram of a chip set that can be used to implement an embodiment of the invention.

FIG. 11 illustrates a chip set or chip 1100 upon which an embodiment of the invention may be implemented. Chip set 1100 is programmed to enable network information collection and access control as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of enabling network information collection and access control.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. For example, a graphics processing unit (GPU) may be included to facilitate the rendering of augmented reality. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to enable network information collection and access control. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:

receiving, by at least one processor, network information associated with a device;

separating the network information into separately accessible anonymized network information and user identifiable information;

enabling access to the anonymized network information independently of the user identifiable information based on a privacy setting;

generating a correlation key associated with the anonymized network information and the user identifiable information; and appending the correlation key to the anonymized network information and the user identifiable information.

2. A method according to claim 1, further comprising:
receiving the correlation key from a requester; and
enabling access by the requester to the user identifiable information associated with the correlation key.

3. A method according to claim 1, wherein the privacy setting includes at least one of the following:
anonymizing all of the network information;
enabling access to the network information, the anonymized network information, the user identifiable information, or a combination thereof to improve a user experience associated with the device; and
enabling access to the network information, the anonymized network information, the user identifiable information, or a combination thereof by one or more third parties.

4. A method according to claim 1, wherein the user identifiable information is a User Name, Mobile Directory Number (MDN), Media Access Control (MAC Address), Mobile Subscriber Integrated Services Digital Network Number (MSISDN), a Subscriber Identity Module (SIM) serial number, International Mobile Subscriber Identity (IMSI), or a combination thereof.

5. A method according to claim 1, wherein the anonymized network information is location history, network usage history, user context information, or a combination thereof.

6. A method according to claim 1, further comprising:
receiving a query for the network information; and
generating a response to the query using the anonymized network information.

7. A method according to claim 6, further comprising:
rendering a user interface for presenting the response to the query,
wherein the user interface is an augmented reality display, a virtual reality display, a mapping display, a signal strength display, or a combination thereof.

8. A method according to claim 1, further comprising:
processing the anonymized network information to determine a radio antenna configuration, a handoff configuration, or a combination thereof for facilitating communications associated with the device.

9. A method according to claim 1, further comprising:
using the anonymized network information to obfuscate contextual information associated with a network resource,
wherein the contextual information includes at least a location of the network resource.

10. An apparatus comprising:
at least one processor; and
at least one memory including computer program code for one or more programs,
the at least one memory and the computer program code configured to, with the at least one process, cause the apparatus to perform at least the following,
receive network information associated with a device;
separate the network information into separately accessible anonymized network information and user identifiable information;
enable access to the anonymized network information independently of the user identifiable information based on a privacy setting;
generate a correlation key associated with the anonymized network information and the user identifiable information; and
append the correlation key to the anonymized network information and the user identifiable information.

11. An apparatus according to claim 10, wherein the apparatus is further caused to:
receive the correlation key from a requester; and
enable access by the requester to the user identifiable information associated with the correlation key.

12. An apparatus according to claim 10, wherein the privacy setting includes at least one of the following:
anonymize all of the network information;
enable access to the network information, the anonymized network information, the user identifiable information, or a combination thereof to improve a user experience associated with the device; and
enable access to the network information, the anonymized network information, the user identifiable information, or a combination thereof by one or more third parties.

13. An apparatus according to claim 10, wherein the user identifiable information is a User Name, Mobile Directory Number (MDN), Media Access Control (MAC Address), Mobile Subscriber Integrated Services Digital Network Number (MSISDN), a Subscriber Identity Module (SIM) serial number, International Mobile Subscriber Identity (IMSI), or a combination thereof.

14. An apparatus according to claim 10, wherein the anonymized network information is location history, network usage history, user context information, or a combination thereof.

15. An apparatus according to claim 10, wherein the apparatus is further caused to:
receive a query for the network information; and
generate a response to the query using the anonymized network information.

16. An apparatus according to claim 15, wherein the apparatus is further caused to:
render a user interface for presenting the response to the query,
wherein the user interface is an augmented reality display, a virtual reality display, a mapping display, a signal strength display, or a combination thereof.

17. An apparatus according to claim 10, wherein the apparatus is further caused to:
process the anonymized network information to determine a radio antenna configuration, a handoff configuration, or a combination thereof for facilitating communications associated with the device.

18. An apparatus according to claim 10, wherein the apparatus is further caused to:
use the anonymized network information to obfuscate contextual information associated with a network resource,
wherein the contextual information includes at least a location of the network resource.

* * * * *